(12) United States Patent
Shi et al.

(10) Patent No.: US 11,980,160 B2
(45) Date of Patent: May 14, 2024

(54) DUST REMOVAL-STERILIZATION-DEODORIZATION INTEGRATED INTELLIGENT LIGHTWEIGHT DEVICE FOR LIVESTOCK AND POULTRY HOUSES (71) Applicants: Henan University of Animal Husbandry and Economy, Zhengzhou (CN); GreenAsia Biotechnology Co., Ltd, Liaocheng (CN)

(72) Inventors: Zhifang Shi, Zhengzhou (CN); Lei Xi, Zhengzhou (CN); Xuanyang Li, Zhengzhou (CN); Pu Cheng, Zhengzhou (CN); Chunhui Hua, Zhengzhou (CN); Sixin Zhang, Zhengzhou (CN); Limin Wang, Zhengzhou (CN)

(73) Assignees: Henan University of Animal Husbandry and Economy, Zhengzhou (CN); GreenAsia Biotechnology Co., Ltd, Liaocheng (CN)

( * ) Notice: Subject to any disclaimer, the term of this patent is extended or adjusted under 35 U.S.C. 154(b) by 0 days.

(21) Appl. No.: 18/513,559

(22) Filed: Nov. 19, 2023

(65) Prior Publication Data
US 2024/0081271 A1 Mar. 14, 2024

Related U.S. Application Data (63) Continuation of application No. PCT/CN2022/078810, filed on Mar. 2, 2022.

(30) Foreign Application Priority Data

Dec. 30, 2021 (CN) .......................... 202111657411.4

(51) Int. Cl.
A01K 1/00 (2006.01)
F24F 8/108 (2021.01)
F24F 8/24 (2021.01)

(52) U.S. Cl.
CPC ............ A01K 1/0052 (2013.01); F24F 8/108 (2021.01); F24F 8/24 (2021.01)

(58) Field of Classification Search
CPC ............ F24F 8/24; F24F 8/108; A01K 1/0052
See application file for complete search history.

(56) References Cited

FOREIGN PATENT DOCUMENTS

CN 212396190 U 1/2021

OTHER PUBLICATIONS

International Search Authority (CNIPA), Written Opinion by the International Search Authority for PCT/CN2022/078810, dated Sep. 27, 2022.
Claims of PCT/CN2022/078810, dated Mar. 2, 2022.

*Primary Examiner* — Sean E Conley (57) ABSTRACT

A dust removal-sterilization-deodorization integrated intelligent lightweight device for livestock and poultry houses includes: a transparent housing, a photocatalyst slidably connected to an inner wall of the transparent housing, filter sleeves rotatably mounted on the inner wall of the transparent housing, a flow guide cavity defined in the transparent housing, a fan fixedly connected to a left sidewall of the flow guide cavity, and a flow baffle fixedly connected to an air inlet end of the flow guide cavity. The filter sleeve includes a low-resistance melt-blown fabric, a rutile manganese-zinc layer is laid on an outer side of the low-resistance melt-blown fabric, a skeleton fabric is attached to an outer wall of the rutile manganese-zinc layer, and an outer wall of the skeleton fabric is rotatably connected to the inner wall of the transparent housing. At least two filter sleeves are transversely arranged, and the filter sleeves are tubular.

10 Claims, 6 Drawing Sheets

DUST REMOVAL-STERILIZATION-DEODORIZATION INTEGRATED INTELLIGENT LIGHTWEIGHT DEVICE FOR LIVESTOCK AND POULTRY HOUSES

CROSS-REFERENCE TO RELATED APPLICATIONS

This application is a continuation of International Application No. PCT/CN2022/078810, filed Mar. 2, 2022, which claims priority to a Chinese patent application No. 202111657411.4 filed on Dec. 30, 2021, the entire contents of which are incorporated herein by reference.

TECHNICAL FIELD

The disclosure relates to the field of environmental treatment technologies, and particularly to a dust removal-sterilization-deodorization integrated intelligent lightweight device for livestock and poultry houses.

BACKGROUND

China has always been a major breeding country of livestock and poultry, and has an astonishing demand for various types of meat such as pork, lamb, and chicken. With an improvement of living standards of Chinese people, an establishment of a concept of balanced diet, and a continuous growth of the population base, consumption of meat food in China will be in a period of vigorous growth for a considerable period of time, which stimulates a prosperous development of the livestock and poultry breeding industry. Most of existing livestock houses are employed a single-function treatment structure or a multi-level single-function treatment structure. The existing livestock houses are not only difficult to cope with complex indoor air treatment, but also have a low treatment life and is difficult to use for a long time. Moreover, due to a flow of internal air, degrees of pollution of air to be treated in respective locations of the treatment structure are not the same, resulting in an inconsistent service life and thus waste during replacement. In order to ensure that the air inside the livestock house meets requirements, a device for multi-level multi-parameter monitoring and treatment is necessary. However, in this way, it not only easy to cause confusion of internal actual configuration space, but also extremely difficult to maintain and repair in the later period. In addition, when various parts of the treatment device carry out respective treatment tasks, it is easy to cause confusion of air indictors at different internal locations, resulting in it is difficult to achieve an overall cleanliness of the internal air. Therefore, there is a need of a dust removal-sterilization-deodorization integrated intelligent lightweight device for livestock and poultry houses.

SUMMARY

Embodiments of the disclosure aim to solve or improve at least one of the above-mentioned technical problems.

A first purpose of embodiments of the disclosure is to provide a dust removal-sterilization-deodorization integrated intelligent lightweight device for livestock and poultry houses.

In a first aspect, an embodiment of the disclosure provides a dust removal-sterilization-deodorization integrated intelligent lightweight device for livestock and poultry houses. The dust removal-sterilization-deodorization integrated intelligent lightweight device for livestock and poultry houses includes: a transparent housing, a photocatalyst slidably connected to an inner wall of the transparent housing, filter sleeves rotatably mounted on the inner wall of the transparent housing, a flow guide cavity defined inside the transparent housing, a fan fixedly connected to a left side wall of the flow guide cavity, and a flow baffle fixedly connected to a middle portion of the flow guide cavity. Each of the filter sleeves includes a low-resistance melt-blown fabric, a rutile manganese-zinc layer disposed/laid on outside the low-resistance melt-blown fabric, and a skeleton fabric attached to an outer wall of the rutile manganese-zinc layer. An outer wall of the skeleton fabric is rotatably connected to the inner wall of the transparent housing. The filter sleeves are at least two in number and transversally arranged. Each the filter sleeve is tubular in shape, and the photocatalyst is disposed on a left side of the filter sleeves.

According to the dust removal-sterilization-deodorization integrated intelligent lightweight device for livestock and poultry houses provided by the embodiment of the disclosure. Because the filter sleeves are rotatably mounted, when spreading an airflow from inside to outside, the airflow can flow out evenly. Moreover, the tubular setting of each the filter sleeve can ensure the use and filtering volumes of the filter sleeve at different positions are more uniform. Each the filter sleeve is employed a three-layer setting, i.e., the low-resistance melt-blown fabric, the rutile manganese-zinc layer, and the skeleton fabric. Therefore, a long-lasting effect can be achieved, an application range is wider, there is no adsorption saturation and secondary pollution release, operation and maintenance cost can be reduced. And the dust removal-sterilization-deodorization integrated intelligent lightweight device for livestock and poultry houses has long-acting catalysis in principle and thus can achieve longer service life. Inorganic materials such as manganese oxide and zinc oxide are constructed into nanofibers, and loaded onto a substrate in the form of mesoporous structure, so that a function of long-acting catalytic and decomposition of ammonia, hydrogen sulfide, formaldehyde and the like can be achieved. The photocatalyst converts light energy into chemical energy under the irradiation of light, which can promote synthesis or degradation of organic matter.

The photocatalyst is slidably mounted, and the filter sleeves are rotatably mounted, which can facilitate disassembly and maintenance in a later stage. The photocatalyst is disposed above the filter sleeves, which can reduce an influence of the filter sleeves to the illumination for the photocatalyst, and the setting of transparent housing can ensure sufficient light illumination for the photocatalyst. Moreover, internal air is heated and thus expanded during flowing, so that the internal air can flow more smoothly from bottom to top.

The photocatalyst and the filter sleeves are integrated into the transparent housing, so that the photocatalyst and the filter sleeves can promote each other, the photocatalyst and the filter sleeves are convenient to be disassembled, and purification steps do not affect each other. The number of the filter sleeves is two or more, a stable and uniform filtration treatment can be achieved.

During an air extraction process through an inlet window, the flow guide cavity and the filter sleeves, the air flows in a form of separating-mixing-separating. The form of separating-mixing-separating ensures that when extracted airs have different degrees of pollution, the air can be mixed and concentrated in the flow guide cavity first, and then separated and exported, so as to avoid aging prematurely caused by air treated locally by the treatment purification structure has excessive degree of pollution.

The sequential treatments carried out by different treatment processes can avoid the confusion of internal space of a livestock house caused by chaotic placement of different treatment structures, and the sequential treatments can avoid the inconsistent degree of internal air treatment. Moreover, the sequential treatments also achieve a centralized arrangement of various treatment structures, reduce the use of fixed structural components and protective components, and thereby achieve an overall lightweight.

In addition, the technical solutions according to the embodiments of the disclosure can further include the following additional technical features.

In an embodiment, ventilation outlets are fixedly disposed on a left sidewall of the fan, the ventilation outlets are at least two in number and circumferentially arranged, lower ports of the ventilation outlets are fixedly mounted with sensors respectively, and the sensors are electrically connected to the fan.

In the illustrated embodiment, by means of the setting of the ventilation outlets and the sensors, when various parts of the device are in an air environment with multiple different degrees of pollution, since an excretion location and a living path of livestock are different, the indoor air exhibits multiple different degrees of pollution, after detection through the sensors, the ventilation outlets are controlled for greater outflow regulation when an excessive value of ammonia is detected. Therefore, the fan can absorb/extract more air at specific locations, making air absorption and treatment more intelligent, and avoiding an unsatisfactory purification effect caused by excessive pollution in an individual indoor area.

In an embodiment, an inner wall of the low-resistance melt-blown fabric is attached to an air guide barrel, an outer wall of the air guide barrel is provided with filter holes, an upper end of the outer wall of the air guide barrel penetrates through the transparent housing, and a lower end of the air guide barrel is disposed inside the flow guide cavity.

In the illustrated embodiment, by means of the air guide barrels, in one aspect, the air guide barrels can provide support and rotation guiding effects to the respective filter sleeves, and in another aspect, the air guide barrels can block primary large particle pollutants in advance through the filter holes, thereby reducing purification burdens of the filter sleeves during use.

In an embodiment, connecting rods are fixedly mounted on a lower surface of each the air guide barrel, and conical rotating blocks are fixedly mounted on a lower surface of the connecting rods and an upper surface of the air guide barrel, respectively. Side walls of the conical rotating blocks are respectively attached to the support ring and the fixing ring, an outer wall of the support ring is fixedly connected to an inner wall of the flow guide cavity, and an outer wall of the fixing ring is threadedly connected to a side wall of the transparent housing.

In the illustrated embodiment, the air guide barrel and the conical rotating block are spaced from each other, and the air guide barrel and the conical rotating block are connected through the connecting rods, making it easier for a lower end opening of the air guide barrel to introduce air and thus improve the smoothness of internal air flow. The use of the conical rotating blocks, in one aspect, it facilitates insertion and rotation guiding, as well as installation; in another aspect, by means of the conical setting, it can be attached to and support a conical inclined surface, and in a long-term repeated installation and rotating wear, can avoid collision and rotational kinetic energy loss caused by an excessive gap between contacted areas.

In an embodiment, fan blades are fixedly mounted on side walls of the connecting rods, respectively.

In the illustrated embodiment, by means of the fan blades, when air enters the air guide barrel from regions among the connecting rods, it can drive the fan, the connecting rods, the air guide barrels, and the filter sleeves to rotate, without the need of external power equipment. Moreover, it can rotate at any time during its operation, an overall autonomy is high, and power loss is reduced.

In an embodiment, an inner wall of the fixing ring and an inner wall of the support ring are respectively formed with oil storage grooves, and each the oil storage groove is annularly arranged along a circumferential direction of the conical rotating block.

In the illustrated embodiment, the oil storage grooves can pre-store lubricating oil therein, ensuring low friction loss between the conical rotating block and the inner wall of the fixing ring, as well as between the conical rotating block and the inner wall of the supporting ring, during use. Moreover, the driving of the air guide barrels and the filter sleeves are facilitated from outside.

In an embodiment, a disassembly-assembly ring is fixedly mounted on an outer wall of the fixing ring, and a gap with a preset distance is formed between an end wall of the disassembly-assembly ring and the outer wall of the transparent housing.

In the illustrated embodiment, the disassembly-assembly rings can facilitate the rotation and fixation of the fixing rings, making it easy for a staff to operate with both hands. The use of the gap with the preset distance, allowing the fixing ring to have an additional threaded-connection rotation distance to adapt to the wear of the conical rotating block. The gap is, for example, with the preset distance of 5 mm.

In an embodiment, a side wall of the photocatalyst is fixedly mounted with a fixing frame, an outer wall of the fixing frame is fixedly mounted with sliding blocks. A U-shaped mounting rack is fixedly mounted on an upper end of the inner wall of the transparent housing, a sliding groove is disposed on an inner wall of the U-shaped mounting rack, and an inner wall of the sliding groove is attached to a side wall of each the sliding block.

In the illustrated embodiment, the sliding blocks are attached to the sliding groove on the inner wall of the U-shaped mounting rack to form a sliding connection, during disassembly and assembly, only the fixing frame is needed to be pulled for moving the photocatalyst, then the photocatalyst can be disassembled and replaced, which makes it convenient for a user to use, and reduces the complexity of later maintenance.

In an embodiment, the inner wall of the transparent housing is fixedly mounted with a light-emitting diode (LED) light tube, the LED light tube is disposed/arranged on a left end of the photocatalyst, and the LED light tube is transversally corresponding to the photocatalyst.

In the illustrated embodiment, the LED light tube is configured to be electrically connected to an external power source, which can continuously illuminate the photocatalyst at night, so that the photocatalyst can do treatment all-day, improving the device's usage time and applicability.

In an embodiment, the transparent housing and the flow baffle are rotatably mounted with sealing rings, respectively. And inner walls of the sealing rings are attached to the outer wall of a corresponding one of the filter sleeves.

In the illustrated embodiment, the sealing rings are employed to seal and block the transparent housing and the filter sleeves, which can avoid air flowing directly from gaps at connections to the inside of the transparent housing, thus ensuring the sealing performance of the device. Moreover, the sealing rings can provide a rotation guiding effect to the air guide barrels and the filter sleeves.

The additional aspects and advantages according to the embodiments of the disclosure will become apparent in the following description, or will be learned through practical experience based on the embodiments of the disclosure.

Description of reference numerals: 1. transparent housing; 101. inlet window; 102. acetate fiber cotton filter; 2. photocatalyst; 201. fixing frame; 202. sliding block; 203. U-shaped mounting rack; 2031. sliding groove; 204. air hole; 3. filter sleeve; 301. low-resistance melt-blown fabric; 302. rutile manganese-zinc layer; 303. skeleton fabric; 4. flow guide cavity; 5. fan; 6. flow baffle; 7. ventilation outlet; 8. sensor; 9. air guide barrel; 901. filter hole; 902. connecting rod; 903. conical rotating block; 10. support ring; 11. fixing ring; 12. fan blade; 13. oil storage groove; 14. disassembly-assembly ring; 15. light-emitting diode (LED) light tube; 16. sealing ring.

DETAILED DESCRIPTION OF EMBODIMENTS

In order to make the above objectives, features, and advantages of the disclosure be more clearly understood, a further detailed description of the disclosure will be made below with reference to the attached drawings and specific embodiments. It should be noted that, on the prerequisite of no conflict, the illustrated embodiments of the disclosure and the features in the illustrated embodiments can be combined with each other.

Many specific details are elaborated in the following description to facilitate a comprehensive understanding of the disclosure. However, the disclosure can also be implemented in other ways different from the ones described herein. Therefore, the scope of protection of the disclosure is not limited by the specific embodiments disclosed below.

Figure 1:
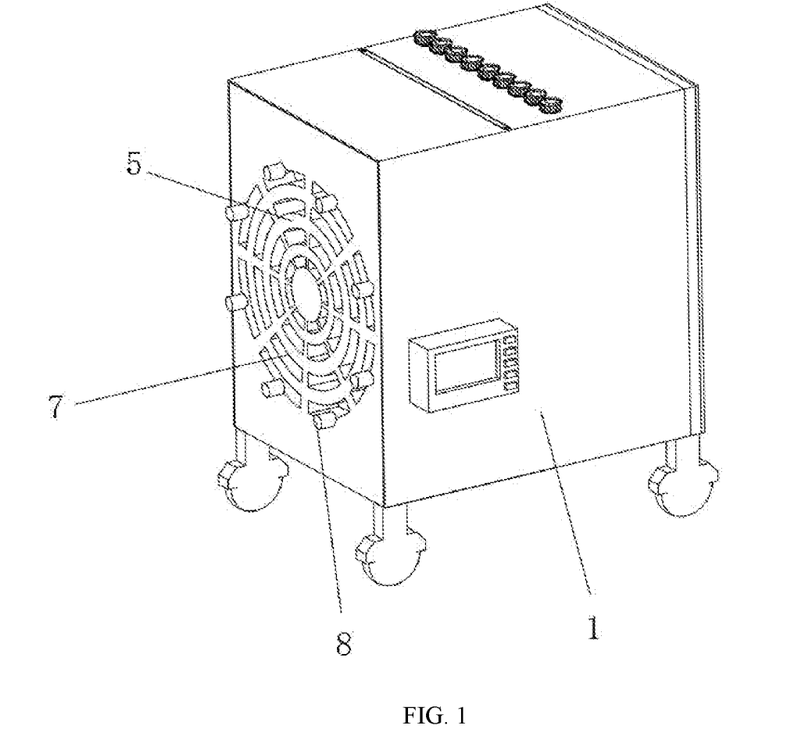
FIG. 1 illustrates a structural schematic diagram of a dust removal-sterilization-deodorization intelligent lightweight device for livestock and poultry houses according to an embodiment of the disclosure.
Figure 2:
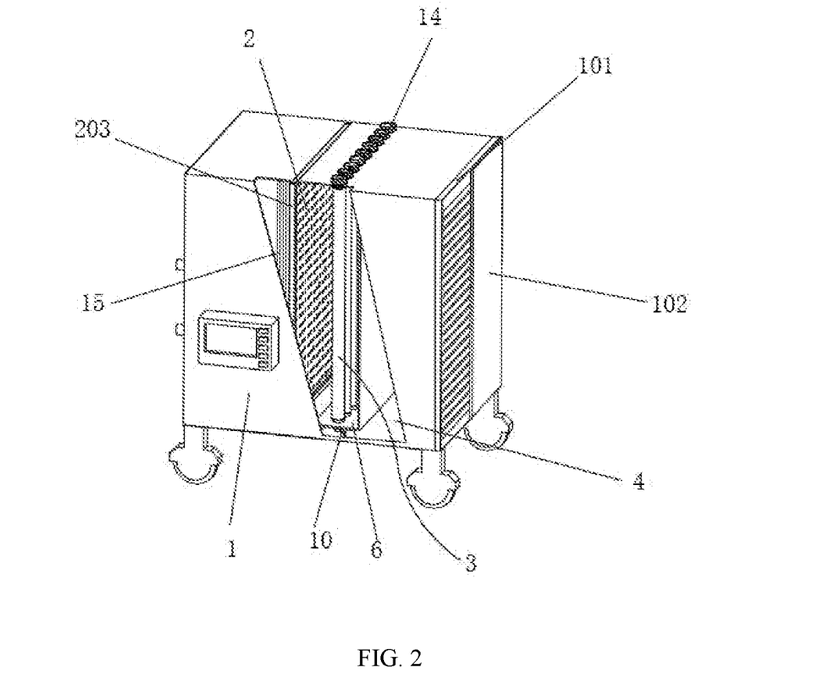
FIG. 2 illustrates a schematic cutaway structural diagram of the dust removal-sterilization-deodorization intelligent lightweight device for livestock and poultry houses according to an embodiment of the disclosure.
Figure 3:
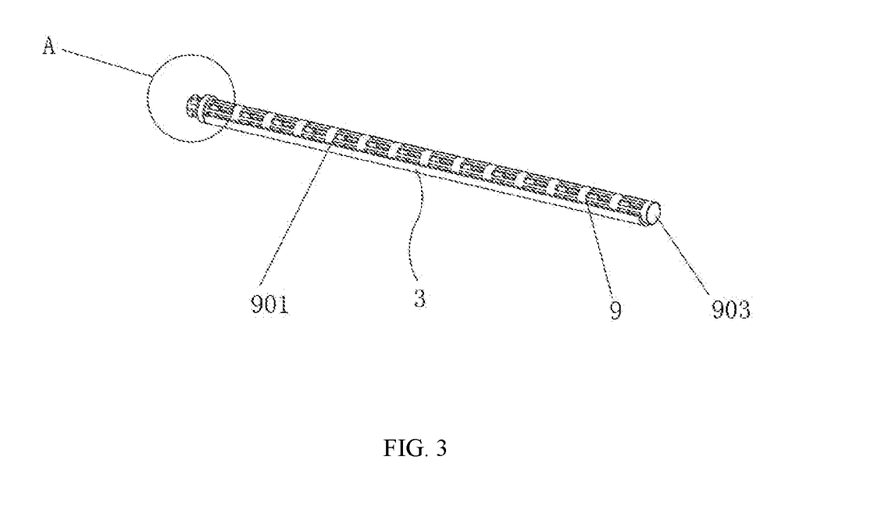
FIG. 3 illustrates a schematic diagram of a filter sleeve after being half-cut and connection structures thereof according to an embodiment of the disclosure.
Figure 4:
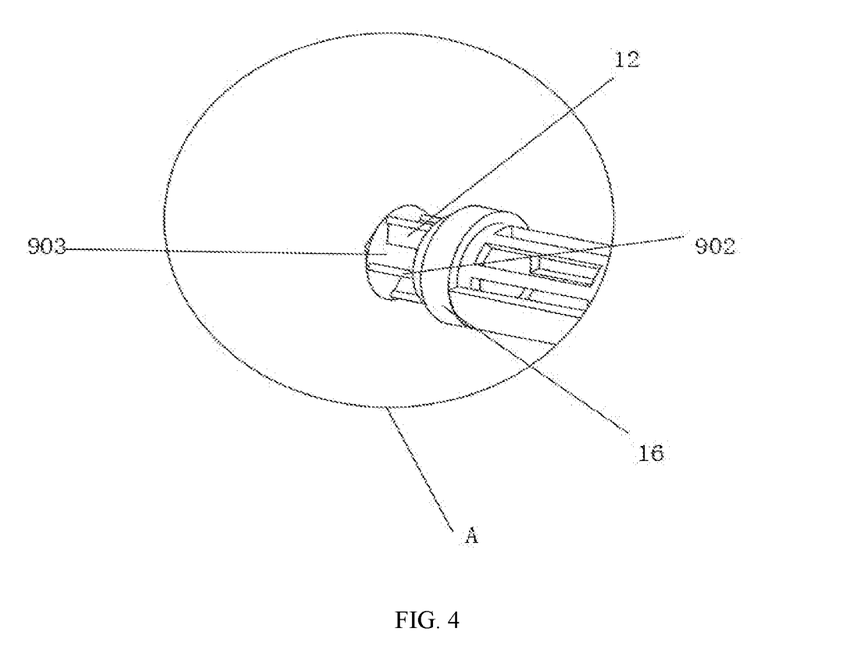
FIG. 4 illustrates a schematic enlarged view of the portion A in FIG. 3.
Figure 5:
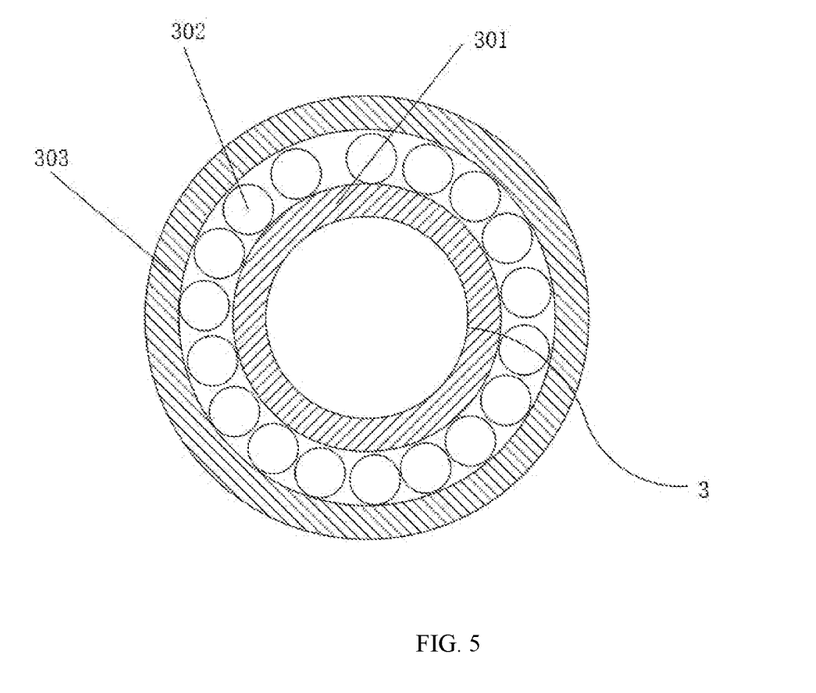
FIG. 5 illustrates a schematic cross-sectional structural diagram of the filter sleeve according to an embodiment of the disclosure.
Figure 6:
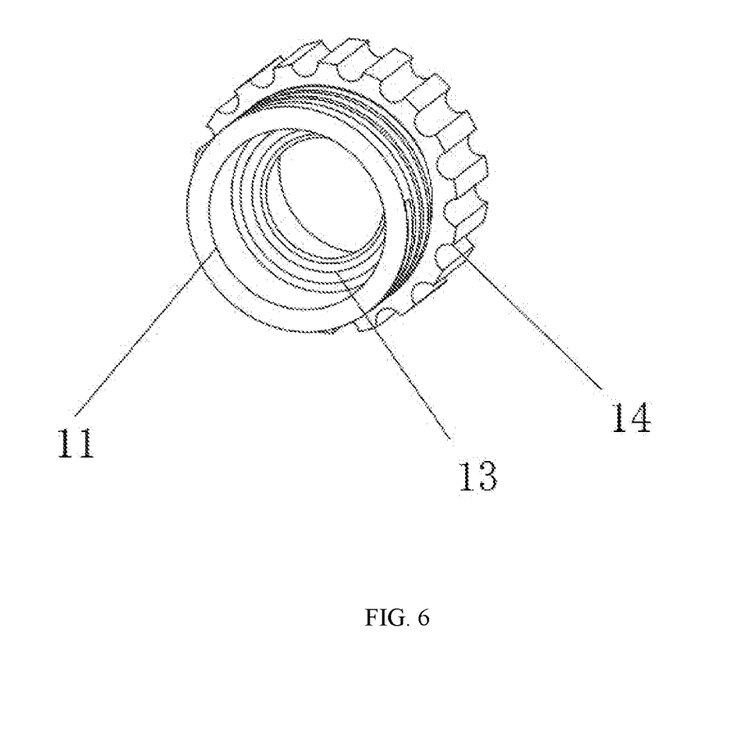
FIG. 6 illustrates a schematic diagram of a fixing ring and a connecting structure thereof according to an embodiment of disclosure.
Figure 7:
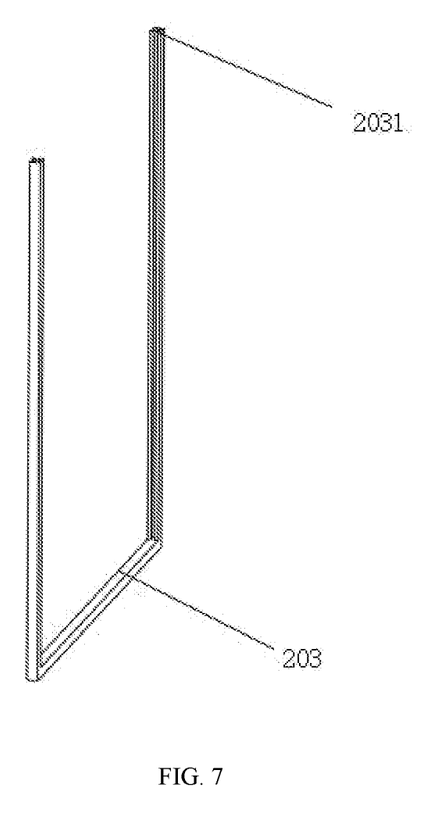
FIG. 7 illustrates a schematic structural diagram of a U-shaped mounting rack according to an embodiment of the disclosure.
Figure 8:
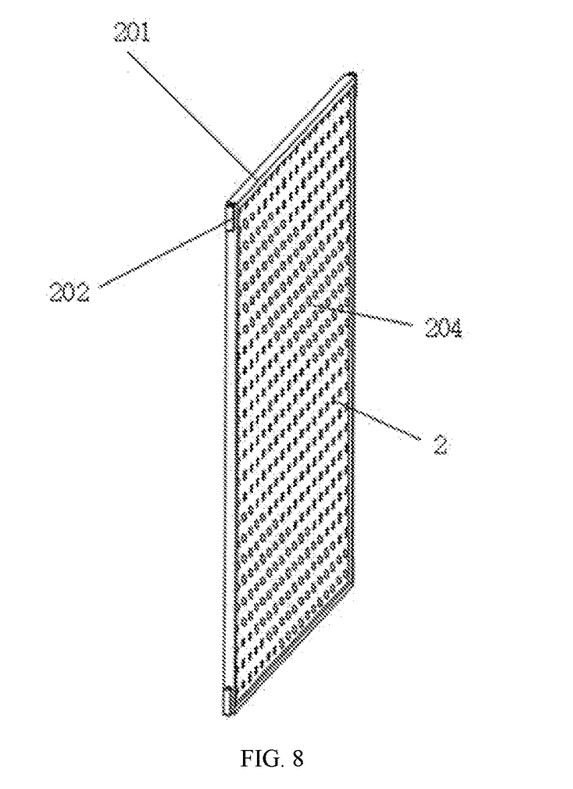
FIG. 8 illustrates a schematic structural diagram of a photocatalyst according to an embodiment of the disclosure.
Figure 9:
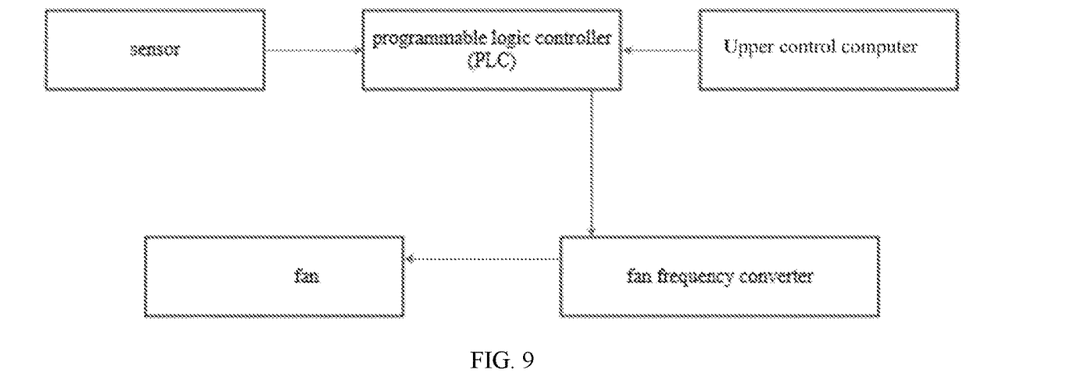
FIG. 9 illustrates a schematic diagram of a control logic of a fan according to an embodiment of the disclosure.

Referring to FIG. 1 through FIG. 9, in a first aspect, an embodiment of the disclosure provides a dust removal-sterilization-deodorization integrated intelligent lightweight device for livestock and poultry houses. The dust removal-sterilization-deodorization integrated intelligent lightweight device includes a transparent housing 1, a photocatalyst 2 is slidably connected to an inner wall of the transparent housing 1, filter sleeves 3 are rotatably mounted on the inner wall of the transparent housing 1, a flow guide cavity 4 is defined inside the transparent housing 1. A fan 5 is fixedly connected to a left sidewall of the flow guide cavity 4, and a flow baffle 6 is fixedly connected to a middle portion of the flow guide cavity 4. Each the filter sleeve 3 includes a low-resistance melt-blown fabric 301, a rutile manganese-zinc layer 302 is disposed/laid on outside the low-resistance melt-blown fabric 301, and a skeleton fabric 303 is attached to an outer wall of the rutile manganese-zinc layer 302. An outer wall of the skeleton fabric 303 is rotatably connected to the inner wall of the transparent housing 1. The filter sleeves 3 are at least two in number and transversally arranged, and each the filter sleeve 3 is tubular in shape. The photocatalyst 2 is disposed/arranged on a left side of the filter sleeves 3.

According to the dust removal-sterilization-deodorization integrated intelligent lightweight device for livestock and poultry houses provided by the embodiment of the disclosure, owing to that the filter sleeves 3 are rotatably mounted, when spreading an airflow from inside to outside, the airflow can flow out evenly. Moreover, the tubular setting of each the filter sleeve 3 can ensure the use and filtering volumes of the filter sleeve 3 at different positions are more uniform. Each the filter sleeve 3 is employed a three-layer setting, i.e., the low-resistance melt-blown fabric 301, the rutile manganese-zinc layer 302, and the skeleton fabric 303. Therefore, a long-lasting effect can be achieved, an application range is wider, there is no adsorption saturation and secondary pollution release, operation and maintenance cost can be reduced, and has long-acting catalysis in principle and thus can achieve longer service life. Inorganic materials such as manganese oxide and zinc oxide are constructed into nano-fibers, and loaded onto a substrate in the form of mesoporous structure, so that a function of long-acting catalytic and decomposition of ammonia, hydrogen sulfide, formaldehyde and the like can be achieved. The photocatalyst 2 converts light energy into chemical energy under the irradiation of light, which can promote synthesis or degradation of organic matter.

The photocatalyst 2 is slidably mounted, and the filter sleeves 3 are rotatably mounted, which can facilitate disassembly and maintenance in a later stage. The photocatalyst 2 is disposed above the filter sleeves 3, which can reduce an influence of the filter sleeves 3 to the illumination for the photocatalyst 2, and the setting of transparent housing can ensure sufficient light illumination for the photocatalyst 2. Moreover, internal air is heated and thus expanded during flowing, so that the internal air can flow more smoothly from bottom to top.

The photocatalyst 2 and the filter sleeves 3 are integrated into the transparent housing 1, so that the photocatalyst 2 and the filter sleeves 3 can promote each other and are convenient to disassemble, and purification steps do not affect each other. The number of the filter sleeves 3 is two or more, a stable and uniform filtration treatment can be achieved.

During an air extraction process through an inlet window 101, the flow guide cavity 104 and the filter sleeves 3, the air flows in a form of separating-mixing-separating. The form of separating-mixing-separating ensures that when extracted airs have different degrees of pollution, they can be mixed and concentrated in the flow guide cavity 104 first, and then separated and exported, so as to avoid aging prematurely caused by air treated locally by the treatment purification structure has an excessive degree of pollution.

The sequential treatments carried out by different treatment processes can avoid the confusion of internal space of a livestock house caused by chaotic placement of different treatment structures, and the sequential treatments can avoid the inconsistent degree of internal air treatment. Moreover, the sequential treatments also achieve a centralized arrangement of various treatment structures, reduce the use of fixed structural components and protective components, and thereby achieve an overall lightweight.

In some embodiments, the transparent housing 1 employs a hollow structure, and includes a box body and an upper cover disposed on an upper end thereof. The inlet window 101 is slidably mounted on the upper cover. The inlet window 101 uses a mesh structure, which can filter large particles of debris, and can conduct air introduction and primary filtration. A right sidewall of the inlet window 101 is detachably disposed with an acetate fiber cotton filter 102, which can be disassembled for cleaning and plays a role in filtering small particles, and prevents device blockage and ventilation rate reduction.

In some embodiments, an upper surface of the photocatalyst 2 is formed with air holes 204 to facilitate a flow of internal air.

In some embodiments, the fan 5 is employed a variable frequency axial flow fan, with a maximum speed of r=2600 revolutions per minute (rpm) and a maximum ventilation rate of Q=2020 cubic meters per hour (m$^3$/h). Calculating based on a pig house has a height (H) of 2.5 meters, a hourly purification area for the pig house by single the device is about A=Q/H=808 square meters (m$^2$).

In an embodiment, the inlet window 101 has a flow area S=0.25 m$^2$, and a maximum airflow velocity V=Q/S=2.24 meters per second (m/s). Through experiments, a sterilization rate of the device is 99.89%, a removal rate of NH$_3$ is 98.7%, a removal rate of particulate matter (PM) 2.5 is 95.3%, and a removal rate of PM10 is 93.6%.

In an embodiment, the flow guide cavity 4 is divided/partitioned by the flow baffle 6.

In some embodiments, as shown in FIG. 1 through FIG. 9, ventilation outlets 7 are fixedly disposed on a left sidewall of the fan 5, the ventilation outlets 7 are at least two in number and circumferentially arranged. Lower ports of the ventilation outlets 7 are fixedly mounted with sensors 8 respectively, and the sensors 8 are electrically connected to the fan 5.

In the illustrated embodiments, by means of the setting of the ventilation outlets 7 and the sensors 8, when various parts of the device are in an air environment with multiple different degrees of pollution (since an excretion location and a living path of livestock are different, the indoor air is exhibited multiple different degrees of pollution), after detection through the sensors 8, the ventilation outlets 7 are controlled for greater outflow regulation when an excessive value of ammonia is detected, so that the fan 5 can absorb/extract more air at specific locations, the fan 5 is employed the variable frequency setting and its operation can be adjusted based on the sensors 8, making air absorption and treatment more intelligent, and avoiding an unsatisfactory purification effect caused by excessive pollution in an individual indoor area.

In some embodiments, the fan 5 is regulated and controlled by a programmable logic controller (PLC), so as to adapt to the changes in overall air pollution caused by different temperature in different periods throughout the year. The PLC is connected to the sensors 8 through a standard communication protocol, and the sensors each can be a temperature sensor, a humidity sensor, a hydrogen sulfide sensor, and/or an ammonia sensor, for data collection. The PLC is inputted for programming by an upper control computer, so that the PLC can adaptively control the fan 5 based on various parameters in different regions, such as temperature, humidity, a hydrogen sulfide content, and an ammonia content. The sensors 8 input converted signals into the PLC, so that the PLC can execute different controls to different data according to the input programming of the upper control computer, and thereby control the fan 5 with the help of a fan frequency converter on the fan 5.

In an embodiment, the upper control computer is used a computer programming, making it convenient for staff to input for programming and carry, and facilitating to carry out operations for different livestock houses. Temperature and humidity sensors are disposed around the device for more comprehensive data acquisition. The fan 5, the upper control computer, the PLC, the fan frequency converter, and the temperature and humidity sensors are all existing commercially available devices.

In some embodiments, as shown in FIG. 1 through FIG. 9, an inner wall of the low-resistance melt-blown fabric 301 is attached to an air guide barrel 9, an outer wall of the air guide barrel 9 is provided with filter holes 901, an upper end of the outer wall of the air guide barrel 9 penetrates through the transparent housing 1, and a lower end of the air guide barrel 9 is disposed inside the flow guide cavity 4.

In the illustrated embodiment, by means of the air guide barrels 9, in one aspect, the air guide barrels 9 can provide support and rotation guiding effects to the respective filter sleeves 3, and in another aspect, the air guide barrels 9 can block primary large particle pollutants in advance through the filter holes 901, thereby reducing purification burdens of the filter sleeves 3 during use.

In some embodiments, as shown in FIG. 1 through FIG. 9, multiple connecting rods 902 are fixedly mounted on a lower surface of each the air guide barrel 9, and conical rotating blocks 903 are fixedly mounted on a lower surface of the connecting rods 902 and an upper surface of the air guide barrel 9, respectively. Side walls of the conical rotating blocks 903 are respectively attached to the support ring 10 and the fixing ring 11, an outer wall of the support ring 10 is fixedly connected to an inner wall of the flow guide cavity 4, and an outer wall of the fixing ring 11 is threadedly connected to a side wall of the transparent housing 1.

In the illustrated embodiment, the air guide barrel 9 and the conical rotating block 903 are spaced from each other, and the air guide barrel 9 and the conical rotating block 903 are connected through the connecting rods 902, making it easier for a lower end opening of the air guide barrel 9 to introduce air and thus improve the smoothness of internal air flow. The use of the conical rotating blocks 903, in one aspect, the conical rotating blocks 903 facilitate insertion and rotation guiding, as well as installation; in another aspect, by means of the conical setting, the conical rotating blocks 903 can be attached to and support a conical inclined surface, and in a long-term repeated installation and rotating wear, can avoid collision and rotational kinetic energy loss caused by an excessive gap between contacted areas.

In some embodiments, as shown in FIG. 1 through FIG. 9, fan blades 12 are fixedly mounted on side walls of the connecting rods 902, respectively.

In the illustrated embodiment, by means of the fan blades 12, when air enters the air guide barrel 9 from regions among the connecting rods 902, it can drive the fan, the connecting rods 902, the air guide barrels 9, and the filter sleeves 3 to rotate, without the need of external power equipment. And moreover, it can rotate at any time during its operation, an overall autonomy is high, and power loss is reduced.

In some embodiments, as shown in FIG. 1 through FIG. 9, an inner wall of the fixing ring 11 and an inner wall of the support ring 10 are respectively formed with oil storage grooves 13, and each the oil storage groove 13 is annularly arranged along a circumferential direction of the conical rotating block 903.

In the illustrated embodiment, the oil storage grooves 13 can pre-store lubricating oil therein, ensuring low friction loss between the conical rotating block 903 and the inner wall of the fixing ring 11, as well as between the conical rotating block 903 and the inner wall of the supporting ring 10, during use. Moreover, the oil storage grooves 13 can facilitate the driving of the air guide barrels 9 and filter sleeves 3 from outside.

In some embodiments, as shown in FIG. 1 through FIG. 9, a disassembly-assembly ring 14 is fixedly mounted on an outer wall of the fixing ring 11, and a gap with a preset distance is formed between an end wall of the disassembly-assembly ring 14 and the outer wall of the transparent housing 1.

In the illustrated embodiment, the disassembly-assembly rings 14 can facilitate the rotation and fixation of the fixing rings 11, making it easy for a staff to operate with both hands. The use of the gap with the preset distance, allowing the fixing ring to have an additional threaded-connection rotation distance to adapt to the wear of the conical rotating block 903. The gap is, for example, with the preset distance of 5 mm.

In some embodiments, as shown in FIG. 1 through FIG. 9, a side wall of the photocatalyst 2 is fixedly mounted with a fixing frame 201, an outer wall of the fixing frame 201 is fixedly mounted with sliding blocks 202. A U-shaped mounting rack 203 is fixedly mounted on an upper end of the inner wall of the transparent housing 1, a sliding groove 2031 is disposed on an inner wall of the U-shaped mounting rack 203, and an inner wall of the sliding groove 2031 is attached to a side wall of each the sliding block 202.

In the illustrated embodiment, the sliding blocks 202 are attached to the sliding groove 2031 on the inner wall of the U-shaped mounting rack 203 to form a sliding connection, during disassembly and assembly, only the fixing frame 201 is needed to be pulled for moving the photocatalyst 2, then the photocatalyst 2 can be disassembled and replaced, which makes it convenient for a user to use and reduces the complexity of later maintenance.

In some embodiments, as shown in FIG. 1 through FIG. 9, the inner wall of the transparent housing 1 is fixedly mounted with a light-emitting diode (LED) light tube 15, the LED light tube 15 is disposed/arranged on a left end of the photocatalyst 2, and the LED light tube 15 is transversally corresponding to the photocatalyst 2.

In the illustrated embodiments, the LED light tube 15 is configured to be electrically connected to an external power source, which can continuously illuminate the photocatalyst 2 at night, so that the photocatalyst 2 can do treatment all-day, improving the device's usage time and applicability.

In some embodiments, as shown in FIG. 1 through FIG. 9, the transparent housing 1 and the flow baffle 6 are rotatably mounted with sealing rings 16, respectively. And inner walls of the sealing rings 16 are attached to the outer wall of a corresponding one of the filter sleeves.

In the illustrated embodiment, the sealing rings 16 are employed to seal and block the transparent housing 1 and the filter sleeves 3, which can avoid air flowing directly from gaps at connections to the inside of the transparent housing 1, thus ensuring the sealing performance of the device. Moreover, the sealing rings 16 can provide a rotation guiding effect to the air guide barrels 9 and filter sleeves 3.

A working principle of the device may be as follows: when the fan 5, the ventilation outlets 7 and the sensor 8 are started, external air passes through the acetate fiber cotton filter 102, the inlet window 101, the air holes 204 of the photocatalyst 2, the air guide barrels 9, the filter sleeves 3, the air holes 204 of the photocatalyst 2, the flow guide cavity 4, the fan 5 and the ventilation outlet 7, and then flows out. During the flowing process of the air, the air flows in a form of separating-mixing-separating, and undergoes a catalytic decomposition of ammonia, hydrogen sulfide, and formaldehyde when passing through the air guide barrel 9 and filter sleeve 3. When the photocatalyst 2 is illuminated, the photocatalyst 2 generates strong oxidizing substances for decomposing organic and some inorganic substances. The strong oxidizing substances can also kill bacteria and viruses, and treat toxins released therefrom to be harmless, and finally the air is discharged through the inlet window 101. When the air passes through the connecting rods 902, the air it drives the fan blades 12 to rotate, and then sequentially drives the connecting rods 902, the air guide barrels 9, and the filter sleeves 3 to rotate. When disassembling, by pulling out the fixing frame 201, the photocatalyst 2 can be taken out. In addition, by rotating the fixing ring 11 and then pulling the air guide barrels 9 out, the corresponding filter sleeve 3 can be taken out.

In the description of the disclosure, it should be understood that orientations or positional relationships indicated by terms such as "longitudinal", "transversal", "upper", "lower", "front", "back", "left", "right", "vertical", "horizontal", "top", "bottom", and "inside", "outside" are based on orientation or positional relationships shown in the attached drawings, and are intended only to facilitate the describing of the disclosure, rather than indicating or implying that a device or an element referred to must have a specific orientation, be constructed and operated in a specific orientation, and is therefore not to be construed as limiting the disclosure.

The above embodiments are only a description of preferred implementations of the disclosure and do not limit the scope of the disclosure. Without departing from the design spirit of the disclosure, various modifications and improvements made by those skilled in the art to the technical solutions of the disclosure should fall within the scope of protection determined in the appended claims of the disclosure.

What is claimed is:

1. A dust removal-sterilization-deodorization integrated intelligent lightweight device for livestock and poultry houses, comprising: a transparent housing (1), a photocatalyst (2) slidably connected to an inner wall of the transparent housing (1), filter sleeves (3) rotatably mounted on the inner wall of the transparent housing (1), a flow guide cavity (4) defined inside the transparent housing (1), a fan (5) fixedly connected to a left sidewall of the flow guide cavity (4), and a flow baffle (6) fixedly connected to a middle portion of the flow guide cavity (4);

wherein each of the filter sleeves (3) comprises a low-resistance melt-blown fabric (301), a rutile manganese-zinc layer (302) is disposed outside the low-resistance melt-blown fabric (301), a skeleton fabric (303) is attached onto an outer wall of the rutile manganese-zinc layer (302), and an outer wall of the skeleton fabric (303) is rotatably connected to the inner wall of the transparent housing (1);

wherein the filter sleeves (3) are at least two in number and transversally arranged, the filter sleeves (3) are tubular in shape, and the photocatalyst (2) is disposed on a left side of the filter sleeves (3).

2. The dust removal-sterilization-deodorization integrated intelligent lightweight device for livestock and poultry houses as claimed in claim 1, wherein ventilation outlets (7) are fixedly disposed on a left sidewall of the fan (5), and the ventilation outlets (7) are at least two in number and circumferentially arranged; sensors (8) are fixedly mounted on lower ports of the ventilation outlets (7) respectively, and the sensors are electrically connected to the fan (5).

3. The dust removal-sterilization-deodorization integrated intelligent lightweight device for livestock and poultry houses as claimed in claim 1, wherein an inner wall of the melt-blown fabric (301) is attached to an air guide barrel (9), an outer wall of the air guide barrel (9) is disposed with filter holes (901), an upper end of the outer wall of the air guide barrel (9) penetrates through the transparent housing (1), and a lower end of the air guide barrel (9) is disposed inside the flow guide cavity (4).

4. The dust removal-sterilization-deodorization integrated intelligent lightweight device for livestock and poultry houses as claimed in claim 1, wherein connecting rods (902) are disposed on a lower surface of the air guide barrel (9), and conical rotating blocks (903) are fixedly mounted on a lower surface of the connecting rods (902) and an upper surface of the air guide barrel (9), respectively; side walls of the conical rotating blocks (903) are respectively attached to a support ring (10) and a fixing ring (11), an outer wall of the support ring (10) is fixedly connected to an inner wall of the flow guide cavity (4), and an outer wall of the fixing ring (12) is threadedly connected to a side wall of the transparent housing (1).

5. The dust removal-sterilization-deodorization integrated intelligent lightweight device for livestock and poultry houses as claimed in claim 4, wherein fan blades (12) are fixedly mounted on side walls of the connecting rods (902), respectively.

6. The dust removal-sterilization-deodorization integrated intelligent lightweight device for livestock and poultry houses as claimed in claim 4, wherein an inner wall of the fixing ring (11) and an inner wall of the support ring (10) are respectively formed with oil storage grooves (13), and each of the oil storage grooves (13) is annularly arranged along a circumferential direction of a corresponding one of the conical rotating blocks (903).

7. The dust removal-sterilization-deodorization integrated intelligent lightweight device for livestock and poultry houses as claimed in claim 4, wherein a disassembly-assembly ring (14) is fixedly mounted on the outer wall of the fixing ring (11), and a gap with a preset distance is defined between an end wall of the disassembly-assembly ring (14) and an outer wall of the transparent housing (1).

8. The dust removal-sterilization-deodorization integrated intelligent lightweight device for livestock and poultry houses as claimed in claim 1, wherein a side wall of the photocatalyst (2) is fixedly mounted with a fixing frame (201), and an outer wall of the fixing frame (201) is fixedly mounted with sliding blocks (202); a U-shaped mounting rack (203) is fixedly mounted on an upper end of the inner wall of the transparent housing (1), a sliding groove (2031) is disposed on an inner wall of the U-shaped mounting rack (203), and an inner wall of the sliding groove (2031) is attached to a side wall of each of the sliding blocks (202).

9. The dust removal-sterilization-deodorization integrated intelligent lightweight device for livestock and poultry houses as claimed in claim 1, wherein a light-emitting diode (LED) light tube is fixedly mounted on the inner wall of the transparent housing (1), the LED light tube (15) is arranged on a left end of the photocatalyst (2), and the LED is transversally corresponding to the photocatalyst (2).

10. The dust removal-sterilization-deodorization integrated intelligent lightweight device for livestock and poultry houses as claimed in claim 1, wherein sealing rings (16) are rotatably mounted on the transparent housing (1) and the flow baffle (6), respectively; and an inner wall of each of the sealing rings (16) is attached to an outer wall of a corresponding one of the filter sleeves (3).

\* \* \* \* \*